Sept. 2, 1969   F. KLUMPP, JR., ET AL   3,464,659
STRAIN RELIEF BUSHING
Filed Nov. 30, 1967   2 Sheets-Sheet 1

INVENTORS
FERDINAND KLUMPP, Jr.
WILLIAM JEMISON
BY
Arelander + Thomas
ATTORNEYS

Sept. 2, 1969  F. KLUMPP, JR., ET AL  3,464,659
STRAIN RELIEF BUSHING

Filed Nov. 30, 1967  2 Sheets-Sheet 2

INVENTORS
FERDINAND KLUMPP, Jr.
WILLIAM JEMISON
BY
Auslander Thomas

ATTORNEYS

3,464,659
STRAIN RELIEF BUSHING
Ferdinand Klumpp, Jr., Mountainside, and William Jemison, Summit, N.J., assignors to Heyman Manufacturing Company, Kenilworth, N.J., a corporation of New Jersey
Filed Nov. 30, 1967, Ser. No. 686,896
Int. Cl. F16l 5/00; B65d 7/48, 11/26
U.S. Cl. 248—56                    9 Claims

ABSTRACT OF THE DISCLOSURE

A one-piece strain relief bushing having two parts connected by a resilient strap, with the strap joining the two parts at their extremities and holding one of the parts away from the central axis of the other, the bending axis of the strap is substantially parallel to the aforementioned central axis, the strap generally defining a U-shape with the strap, when the bushing is in closed position adapted to support the conductor inserted therein.

---

The present invention relates to a new self locking strain relief bushing for an electrical conductor comprising an integral one-piece unit, a body, a strap and a grip block.

Strain relief devices are used to firmly hold an electrical conductor such as a standard electric cord in an aperture usually in a panel associated with an electrical appliance or other electrically operated device.

The strain relief bushings of the past once engaged in the aperture with a wire leading through have usually held themselves in the aperture and firmly gripped the electric cord so that any strain exerted on the cord would impinge at the bushing rather than at the point of connection of the electric cord where damage might occur.

It has been found advantageous to provide the hollow shank of the bushing with an integral hinge or strap to the grip block so that in assembly an operator could hold the bushing in one hand while laying the wire in it and then not have to search for an inventory of grip blocks and usually one handedly be able to close the grip block in position ready for locking insertion in the aperture in a panel.

In the past the hinge at the shank had proven unsatisfactory because the pieces had to have relatively large cutaway areas in order for the pieces to rotate into position and the flexing of the hinge usually did not allow enough latitude for stretch in the bushing and oftentimes the held wires were cut or damaged by the grip block applying too much pressure.

The introduction of a backward extending strap attached from the extremity of the shank to the extremity of the grip block, substantially improved the one-piece strain bushing. The strap length provided a flexibility for an easy swing fit of the grip block and one-hand operability.

The bushing straps of the past placed at the extremity of a bushing, within a panel, whether having a bending axis at a right angle to the shank axis or crossing it, were awkward. While such straps bent in such a manner as to present no protrusion beyond the tapered surface of the closed bushing, they held the free grip block on a line with the center axis of the shank of the open bushing. An extra movement was required in order to close the bushing. A wire placed in the shank tended to stretch across the grip block which had to be moved aside in order to close the bushing prior to insertion in a panel.

The strain relief bushing of the past having angulated or curved straps at the extremities of the pieces normally inside the panel with the strap being bendable with an axis crossing the centerline of the shank at a right angle was even more awkward. Not only was the grip block on a line with the wire placed in the hollow of the shank but the grip block had to be moved aside and twisted, twisting the strap before the bushing could be readied for insertion into a panel.

The extremity of the bushing within the panel seemed a logical place for the location of straps of the past since it provided no protrusion beyond the taper of the grommet allowing the grommet with the engaged wire a smoother path into locking position in a panel.

To avoid the problems of the strap on the extremity, a shank strap and grip block were developed where the bending axis of the strap was parallel to the central axis of the shank. While this may have seemed an improvement over the hinge and the straps connecting the inner panel extremities the side strap presented problems too.

For easy insertion into a panel the side strap could not protrude beyond the diameter of the outer flange of the bushing and preferably protruded less than the diameter of the panel opening.

A short strap, short enough to barely protrude tended to be hard to close, especially with one hand, and had many of the disadvantages of a hinge. A long strap which was more easily closeable upon the insertion of the wire was difficult or impossible to insert into the panel. The bushing had to start to be inserted at an angle to get the strap loop behind the panel since its diameter with the protruding strap was greater than the panel opening diameter. Inserting in some cases was difficult or impossible since the angulation of the bushing for insertion with a conductor wire protruding down its centerline often provided a turning radius of the bushing for insertion with the wire protruding, in excess of the diameter of the panel opening, a problem the straight insertion of old in the panel extremity strap would not encounter since the bushing could be pushed straight into the panel without need to turn it.

Further improvement of the art included a strain relief bushing with an angulated strap extending from the body of the bushing and holding a grip block away from the central axis of the shank beyond the width of the shank channel and yet holding the grip block free to close into the shank to hold a conductor and form a unit for insertion into a panel.

By thus disposing the strap, either from the front flange or the shank the grip block is not held on a line with the shank, having to be moved out of the way of the inserted wire upon closing the bushing. The strap may usually be a length for conveniently and easily closing the grip block over the wire in the shank since the loop protrusion of the strap presents little or no difficulty when the bushing is being inserted into a panel. The loop from the head flange of course provides no problem of protrusion while the bushing is being inserted.

One problem even in improvements of the past was that bushings with the straps on the shank often required a small turn to get the angulated loop of the strap on a closed bushing past the panel opening.

The turning or twisting to insert still provide some difficulty in the insertion of bushings with conductors. These movements cost money in labor cost to insert bushings. What was more, certain combinations of wire and panel aperture openings were more difficult to engage in apertures than others. The wires by their nature of width or flexibility did not provide full ease of snap-in insertion.

According to the present invention, a strain relief bushing is provided with the body and grip block held by a strap generally defining a U-shape extending from the extremities of the shank and grip block in such a way as to hold the grip block away from the center width of the shank channel, the strap having a bending axis parallel to the central axis of the shank channel.

The defined U shape of the strap configuration provides unexpected advantages over other strap configurations. When the bushing is closed over a conductor wire, the strap tends to wrap around the conductor wire and provide support for the conductor wire. The wrapping of the strap places the flat portion of the strap against the conductor wire portion minimizing protrusion of any portion of the bushing extending beyond the electrical conductor. In combination therefore the defined U shape of the strap provides an easily closeable bushing providing support and holding the grip block away from the centerwidth of the shank channel when the bushing is in open position.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
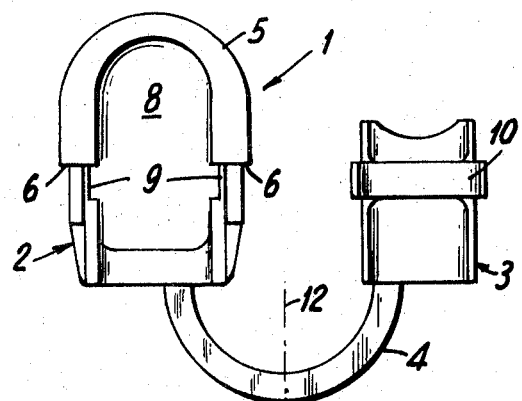
FIG. 1 is a plan view of a bushing of the present invention.
Figure 2:
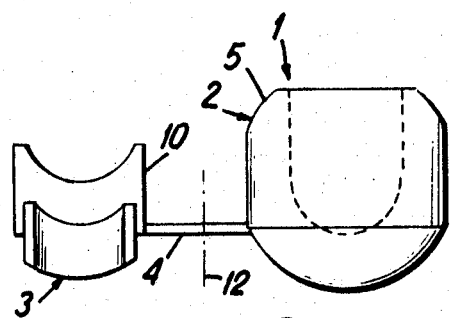
FIG. 2 is a front elevation of FIG. 1.
Figure 3:
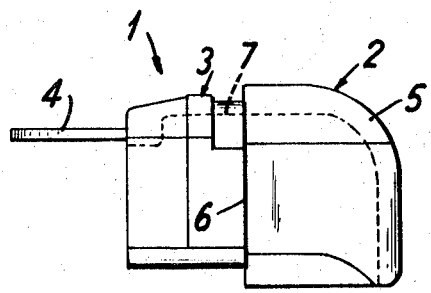
FIG. 3 is a side elevation of FIG. 1.

The strain relief bushing 1 as shown in FIGS. 1-3 is provided with a shank 2 and a grip block 3. The shank 2 and grip block 3 are joined by a strap 4 defining a U shape, the strap 4 leading from the extremities of the shank 2 and grip block 3.

The head 5 of the bushing 1 as shown in FIG. 3 is one adapted to receive a conductor wire through the bushing and have the conductor wire make an approximate 90° bend as it extends from the bushing 1. The rear rim 6 of the head 5 acts as a flange to engage a panel when the bushing 1 is inserted and lock the bushing 1 into a panel gripped between the recess 7 and the rear rim 6. The grip block 3 may have a recess (not shown) to complete circumferential gripping of the bushing once inserted to a panel with a conductor wire engaged.

Figure 4:
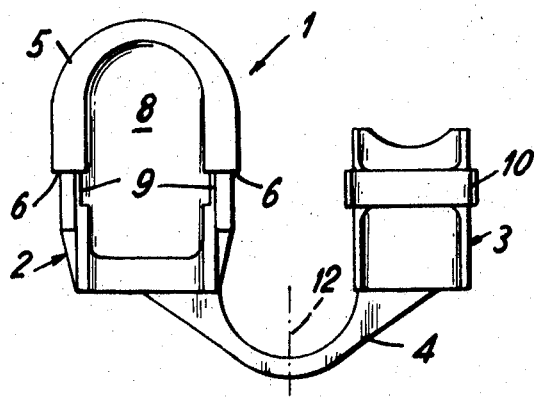
FIG. 4 is a plan view of another embodiment of the present invention.
Figure 5:
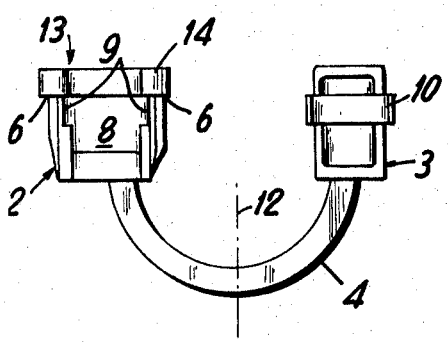
FIG. 5 is a plan view of another embodiment of the present invention.
Figure 6:
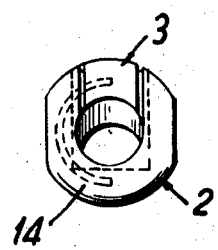
FIG. 6 is a front elevation of the bushing of FIG. 5 in closed position.

In FIG. 4 another configuration of a U defining strap 4 is shown on a bushing shank such as shown in FIGS. 1-3.

The bushing 1 has a central channel 8 with small recessed side channels 9 which accept the tongue 10 for snugly receiving the grip block 3 in the shank portion 2 of the bushing 1.

Figure 8:
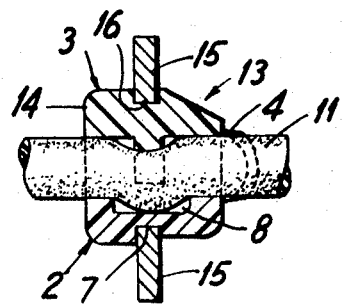
FIG. 8 is a section of the bushing of FIG. 5 with a conductor wire held in a panel.

To close a conductor wire 11 such as shown in FIG. 8 into the bushing 1 the wire 11 is inserted into the channel 8 then the grip block 3 is engaged in the recessed side channels 9 and compressed over the conductor 11. In closing the bushing 1 with the conductor 11 inserted therein the strap 4 bends about its bending axis 12 and loops around the conductor 11.

The bushing 13 as shown in FIGS. 5-8 is substantially the same as the bushing shown in FIGS. 1-4 except that its head portion 14 is a flat flange which allows the conductor wire 11 to pass straight through the central channel 8 as shown in FIG. 8 without making a turn in the conductor wire 11 as it is extended from the flange head 14. The bushing 13 engages the panel 15 at its aperture as shown in FIG. 8 engaging itself in the recess 7 and the recess 16 in the grip block 3. The strap 4 as can be seen in FIG. 8 snugly holds the conductor wire 11.

Figure 9:
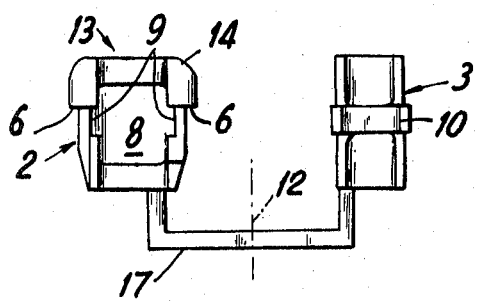
FIG. 9 is a plan view of another embodiment of the present invention.
Figure 10:
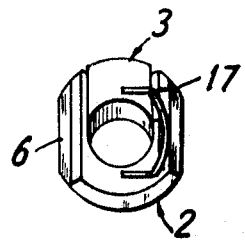
FIG. 10 is a rear elevation of the bushing of FIG. 9 in closed position.

The bushing 16 as shown in FIG. 9 is provided with a squared U shaped strap 17 effecting substantially the same closure and support as shown in the embodiments of the bushings 1, 13 in FIGS. 1-8, the closed bushing 13 and strap 17 of FIG. 9 are shown in rear elevation in FIG. 10.

Figure 13:
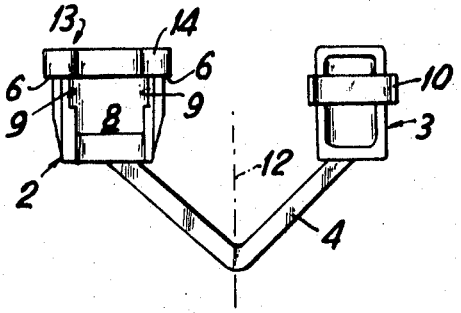
FIG. 13 is a plan view of another embodiment of the present invention.

As shown in FIG. 13 while the strap may define a U with respect to its affixation points on the bushing parts and its central axis, the actaul strap configuration itself may be varied, such as the V shape illustrated.

Figure 11:
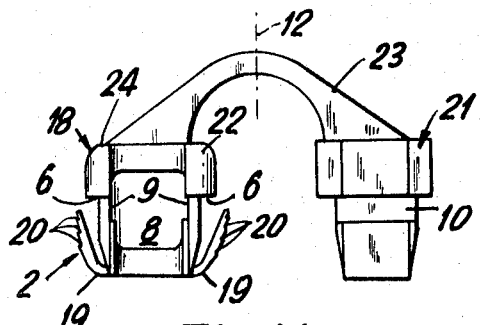
FIG. 11 is a plan view of another embodiment of the present invention.
Figure 12:
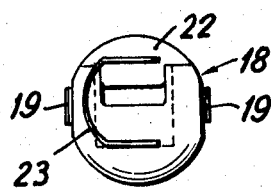
FIG. 12 is a front elevation of the bushing of FIG. 11 in closed position.

The bushing 18 as shown in FIGS. 11 and 12 is provided with fingers 19 having stepped shoulders 20 for engaging a panel. The grip block 21 fits over the flange head 22 and seats itself in fixed position on top of the flange head 22 locked into the aperture by the fingers 19 and shoulders 20 with the tongue 10 riding in the side channels 9 to keep the grip block 21 steady against movement when locked into an aperture. The panel 15 is grasped between the rear rim 6 and the spread finger 19 and shoulders 20.

The strap 23 is adapted to fit snugly about a conductor wire 11 giving it support, the strap 23 by its close fit is visibly almost obscured as it extends from the head flange 22. The bushing 18 has all the advantages of the strap 23 support given by the strap 23 and the ease of closure with a minimum of visible exposure of the folded protruding strap 23.

As can be seen the straps 4, 17, 23 bend about an axis 12 which is parallel to the width or central longitudinal axis of the central channel 8 and yet hold the grip blocks 3, 21 away from any interference with a conductor wire 11 when it is inserted into the channel 8 prior to closing.

Figure 7:
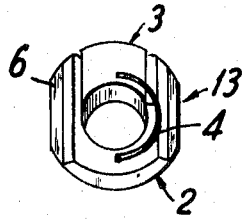
FIG. 7 is a rear elevation of the bushing of FIG. 5 in closed position.

The length of the straps 4, 17, 23 allow freedom of movement for closing the bushing 1, 13, 18 without the awkwardness of short straps or hinges of the past yet the length of the straps 4, 17, is such that it does not have to protrude beyond the outer width of the shank 2 so as to impede insertion of the bushings 1, 13. Thus insertion in an aperture is facilitated with an easy closing bushing thus, as is shown in FIG. 7 when the bushing is in closed position, the strap lies within the longitudinal plane of the bushing.

Where the strap 23 protrudes from the head flange 22 there is no problem of the strap 17 impeding insertion of the bushing 18.

When the bushings 1, 13, 18 are closed only the thin width of the strap 4, 17, 23 are exposed. Many of the straps of the past in such closed positions exposed a protrusion equal to the entire width of the strap providing an edge that might engage close fitting parts or providing an aesthetically less acceptable appearance.

The terms and expressions which are employed are used as terms of description; it is recognized, though that various modifications are possible within the scope of the invention claimed.

Having thus described certain forms of the invention in some detail, what is claimed is:

1. A one-piece strain relief bushing for holding an electric conductor in an aperture in a panel comprising a first part and a second part, said first and second parts adapted to form a shank including a channel, recess means in said channel, tongue means adapted to fit into said recess, panel locking means, and resilient strap means adapted to join said first and second parts at the extremities thereof, said strap means defining a U-shape, said strap means including a central bending axis substantially parallel to the central axis of at least one of said parts, said strap holding said second part away from a centerline approximately the width of the channel portion of said first part when in normal position.

2. The invention of claim 1 wherein a portion of said strap wraps around said conductor wire when said bushing is in closed position.

3. The invention of claim 1 wherein said bushing includes a flanged portion at one of its extremities, and said strap joins said first and second portions at said flanged extremity.

4. The invention of claim 1 wherein said panel locking means includes fingers extending outward from the periphery of said bushing, said fingers including stepped shoulder portions thereon.

5. The invention of claim 1 wherein said strap when said bushing is in closed position lies within the longitudinal plane of said bushing.

6. The invention of claim 1 wherein said strap means joins said first and second parts at their extremity portions normally not exposed when said bushing is in said aperture in said panel.

7. The invention of claim 1 wherein said strap defines a squared U-shape.

8. The invention of claim 1 including a rear rim and said shank portion tapering back from said rear rim.

9. The invention of claim 1 wherein the strap is substantially V-shaped.

References Cited

UNITED STATES PATENTS

| | | | |
|---|---|---|---|
| 2,930,840 | 3/1960 | Klumpp | 174—153 |
| 2,974,186 | 3/1961 | Klumpp | 16—2 X |
| 3,249,687 | 5/1966 | Klumpp | 16—2 X |
| 3,258,234 | 6/1966 | Fernberg | 248—56 |
| 3,290,430 | 12/1966 | Klumpp | 174—153 |

CHANCELLOR E. HARRIS, Primary Examiner

U.S. Cl. X.R.

16—2; 174—153